US010082654B2

(12) United States Patent
Weida et al.

(10) Patent No.: US 10,082,654 B2
(45) Date of Patent: *Sep. 25, 2018

(54) INFRARED IMAGING MICROSCOPE USING TUNABLE LASER RADIATION

(71) Applicant: DAYLIGHT SOLUTIONS, INC., San Diego, CA (US)

(72) Inventors: Miles James Weida, Poway, CA (US); Timothy Day, Poway, CA (US)

(73) Assignee: DAYLIGHT SOLUTIONS, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/209,596

(22) Filed: Jul. 13, 2016

(65) Prior Publication Data

US 2016/0320597 A1    Nov. 3, 2016

Related U.S. Application Data

(63) Continuation of application No. 14/353,487, filed as application No. PCT/US2012/061987 on Oct. 25, 2012, now Pat. No. 9,432,592.

(Continued)

(51) Int. Cl.
*H04N 9/47* (2006.01)
*G02B 13/14* (2006.01)
(Continued)

(52) U.S. Cl.
CPC ......... *G02B 21/0056* (2013.01); *G02B 21/00* (2013.01); *G02B 21/0088* (2013.01);
(Continued)

(58) Field of Classification Search
CPC ..... H04N 5/33; G02B 21/088; G02B 21/0056
See application file for complete search history.

(56) References Cited

U.S. PATENT DOCUMENTS

| 3,391,974 A | 7/1968 | Ride et al. |
| 3,796,220 A | 3/1974 | Bredemeier |

(Continued)

FOREIGN PATENT DOCUMENTS

| EP | 2194409 A3 | 6/2010 |
| JP | UH01108508 | 7/1989 |

(Continued)

OTHER PUBLICATIONS

Office Action dated Aug. 4, 2016 for Japanese Patent Application No. 2014-539021, filed Apr. 24, 2014.

(Continued)

*Primary Examiner* — Tsion B Owens
(74) *Attorney, Agent, or Firm* — Roeder & Broder LLP; Steven G. Roeder

(57) ABSTRACT

An imaging microscope (12) for generating an image of a sample (10) comprises a beam source (14) that emits a temporally coherent illumination beam (20), the illumination beam (20) including a plurality of rays that are directed at the sample (10); an image sensor (18) that converts an optical image into an array of electronic signals; and an imaging lens assembly (16) that receives rays from the beam source (14) that are transmitted through the sample (10) and forms an image on the image sensor (18). The imaging lens assembly (16) can further receive rays from the beam source (14) that are reflected off of the sample (10) and form a second image on the image sensor (18). The imaging lens assembly (16) receives the rays from the sample (10) and forms the image on the image sensor (18) without splitting and recombining the rays.

19 Claims, 3 Drawing Sheets

Related U.S. Application Data

(60) Provisional application No. 61/551,147, filed on Oct. 25, 2011.

(51) Int. Cl.
  *G02B 21/00* (2006.01)
  *G02B 21/08* (2006.01)
  *G02B 21/36* (2006.01)
  *H04N 5/33* (2006.01)

(52) U.S. Cl.
  CPC ......... *G02B 21/088* (2013.01); *G02B 21/365* (2013.01); *H04N 5/33* (2013.01)

(56) References Cited

U.S. PATENT DOCUMENTS

| | | | |
|---|---|---|---|
| 4,184,737 A | 1/1980 | Hirschberg | |
| 4,450,460 A | 5/1984 | Morimoto | |
| 4,595,829 A | 6/1986 | Neiimann | |
| 5,118,945 A | 6/1992 | Winschuh et al. | |
| 5,156,943 A | 10/1992 | Whitney | |
| 5,202,792 A | 4/1993 | Rollin | |
| 5,208,648 A | 5/1993 | Batchelder et al. | |
| 5,220,403 A | 6/1993 | Batchelder et al. | |
| 5,225,678 A | 7/1993 | Messerchmidt | |
| 5,260,965 A | 11/1993 | Nakazeki et al. | |
| 5,311,021 A * | 5/1994 | Messerschmidt | G01N 21/255 250/339.07 |
| 5,865,829 A | 2/1999 | Kitajima | |
| 5,880,880 A | 3/1999 | Anderson et al. | |
| 5,894,122 A | 4/1999 | Tomita | |
| 5,907,431 A | 5/1999 | Stuttler | |
| 5,920,432 A | 7/1999 | Suenaga et al. | |
| 5,995,283 A | 11/1999 | Anderson et al. | |
| 6,016,226 A | 1/2000 | Arisawa | |
| 6,069,744 A | 5/2000 | Kusaka et al. | |
| 6,076,929 A | 6/2000 | Stuttler | |
| 6,094,300 A | 7/2000 | Kashima et al. | |
| 6,181,480 B1 | 1/2001 | Ito | |
| 6,387,715 B1 | 5/2002 | Davis et al. | |
| 6,437,913 B1 | 8/2002 | Kishi | |
| 6,501,603 B2 | 12/2002 | Kasahara | |
| 6,747,804 B2 | 6/2004 | Fujimoto et al. | |
| 6,975,129 B2 | 12/2005 | Chang | |
| 7,009,171 B2 | 3/2006 | Sasaki | |
| 7,009,763 B1 | 3/2006 | Wolleschensky | |
| 7,069,985 B2 | 7/2006 | Wang | |
| 7,158,310 B2 | 1/2007 | Sakakura et al. | |
| 7,180,661 B2 | 2/2007 | Sasaki | |
| 7,193,424 B2 | 3/2007 | Chang | |
| 7,196,843 B2 | 3/2007 | Nakata | |
| 7,223,986 B2 | 5/2007 | Natori | |
| 7,233,437 B2 | 6/2007 | Hirata et al. | |
| 7,582,870 B2 | 9/2009 | Lee et al. | |
| 7,643,216 B2 | 1/2010 | Winterot et al. | |
| 7,646,542 B2 | 1/2010 | Yonetani | |
| 7,663,807 B2 | 2/2010 | Yonetani | |
| 7,672,057 B2 | 3/2010 | Shi et al. | |
| 7,675,676 B2 | 3/2010 | Nakata | |
| 7,855,831 B2 | 12/2010 | Wolleschenksy et al. | |
| 7,876,505 B1 | 1/2011 | Olczak | |
| 7,894,131 B2 | 2/2011 | Kubo | |
| 7,902,523 B2 | 3/2011 | Motomura | |
| 7,907,348 B2 | 3/2011 | Shi et al. | |
| 7,915,575 B2 | 3/2011 | Yokoi | |
| 7,965,450 B2 | 6/2011 | Yonetani | |
| 8,154,718 B2 | 4/2012 | Graf et al. | |
| 8,780,347 B2 | 7/2014 | Kotidis et al. | |
| 2003/0197924 A1 | 10/2003 | Nakata | |
| 2003/0227611 A1* | 12/2003 | Fein | G01N 1/2813 356/36 |
| 2004/0178334 A1 | 9/2004 | Sasaki | |
| 2004/0178356 A1 | 9/2004 | Natori | |
| 2004/0245445 A1 | 12/2004 | Suzuki | |
| 2004/0262522 A1 | 12/2004 | Kitahara et al. | |
| 2005/0030054 A1 | 2/2005 | Chang | |
| 2005/0072913 A1 | 4/2005 | Lange et al. | |
| 2005/0122579 A1 | 6/2005 | Sasaki | |
| 2005/0194126 A1 | 9/2005 | Wang | |
| 2005/0269510 A1 | 12/2005 | Chang | |
| 2005/0270641 A1 | 12/2005 | Hirata et al. | |
| 2007/0033680 A1 | 2/2007 | Takahashi | |
| 2007/0139753 A1 | 6/2007 | Nakata | |
| 2007/0247618 A1 | 10/2007 | Graf et al. | |
| 2008/0018966 A1* | 1/2008 | Dubois | G01B 9/021 359/9 |
| 2008/0192339 A1 | 8/2008 | Kubo | |
| 2008/0204760 A1 | 8/2008 | Gollier et al. | |
| 2008/0290293 A1 | 11/2008 | Motomura | |
| 2008/0304047 A1 | 12/2008 | Lee et al. | |
| 2009/0108187 A1 | 4/2009 | Yokoi | |
| 2009/0109527 A1 | 4/2009 | Sasaki et al. | |
| 2009/0213882 A1* | 8/2009 | Weida | G01N 21/3504 372/23 |
| 2009/0323058 A1* | 12/2009 | Dyba | G01N 21/65 356/301 |
| 2010/0079857 A1 | 4/2010 | Sasaki et al. | |
| 2010/0118396 A1 | 5/2010 | Nakata | |
| 2010/0172021 A1 | 6/2010 | Suzuki | |
| 2011/0113516 A1 | 5/2011 | Fink et al. | |
| 2011/0134521 A1 | 6/2011 | Truong et al. | |
| 2011/0248166 A1 | 10/2011 | Diem et al. | |
| 2011/0304723 A1* | 12/2011 | Betzig | G02B 21/002 348/79 |
| 2012/0033220 A1 | 2/2012 | Kotidis et al. | |
| 2012/0223260 A1 | 9/2012 | Hansen et al. | |
| 2013/0057751 A1 | 3/2013 | Ohtake et al. | |
| 2013/0296710 A1 | 11/2013 | Zuzak et al. | |
| 2013/0335797 A1* | 12/2013 | Cooper | G02B 21/16 359/199.2 |
| 2014/0253714 A1 | 9/2014 | Weida et al. | |
| 2015/0051498 A1 | 2/2015 | Darty | |
| 2015/0230702 A1* | 8/2015 | Uhlhorn | A61B 3/14 351/206 |
| 2016/0169747 A1 | 6/2016 | Weida | |

FOREIGN PATENT DOCUMENTS

| | | |
|---|---|---|
| JP | AH01221850 | 9/1989 |
| JP | A2006301599 | 11/2006 |
| JP | A2006350034 | 12/2006 |
| JP | A2007024758 | 2/2007 |
| JP | A2007147743 | 6/2007 |
| JP | A2008502929 | 1/2008 |
| WO | WO9845744 A2 | 10/1998 |
| WO | WO2009109979 A2 | 9/2009 |
| WO | WO2012140083 A1 | 10/2012 |
| WO | WO2013063316 A1 | 5/2013 |
| WO | WO2014209471 A2 | 12/2014 |
| WO | WO2016007925 A1 | 1/2016 |
| WO | WO2016177897 A1 | 11/2016 |

OTHER PUBLICATIONS

Office Action dated Jul. 28, 2017 for Japanese Patent Application No. 2014-539021, filed Apr. 24, 2014.
Brochure for LaserScope IR Microscope, pp. 1-2, Block Engineering, 2011.
Brochure for Nicolet Continuum Infrared Microscope, pp. 1-12, Thermo Fisher Scientific, 2011.
Nasse, et al., High Resolution Fourier-transform infrared chemical imaging with multiple synchrotron beams, Nature Methods, vol. 8, No. 5, pp. 413-416, May 2011.
Phillips, et al., Infrared hyperspectral imaging using a broadly tunable external cavity quantum cascade laser and microbolometer focal plane array, Optics Express, vol. 16., No. 3, Feb. 4, 2008.
Li, et al., Recent Development of Ultra Small Pixel Uncooled Focal Plane Arrays at DRS, SPIE vol. 6542, pp. 66421Y-1 to 65421Y-12, Aug. 2011.

(56) References Cited

OTHER PUBLICATIONS

The International Search Report and Written Opinion of the International Searching Authority for PCT/US2012/061987, Daylight Solutions, Inc., Feb. 11, 2013 (related application).
The International Preliminary Report on Patentability, dated Apr. 29, 2014, Daylight Solutions, Inc., PCT/US2012/061987.
Matthew R. Kole et al.: "Discrete Frequency Infrared Microspectroscopy and Imaging with a Tunable Quantum Cascade Laser", Analytical Chemistry, vol. 84, No. 23, Dec. 4, 2012, pp. 10366-10372.
Lowenthal S. et al.: "Speckle Removal by a Slowly Moving Diffuser Associated with a Motionless Diffuser", Journal of the Optical Society of America, American Institute of Physics, New York, US, vol. 61, No. 7, Jul. 1, 1971, pp. 847-851.
Frank Fuchs et al.: "Imaging Stand-off Detection of Explosives Using Tunable MIR Quantum Cascade Lasers", Optical Sensing II, vol. 7608, Jan. 23, 2010, p. 760809.
Communication from EPO (Office Action) in EPO Application Serial No. 12794798.4, dated Mar. 21, 2018. EPO Application Serial No. 12794798.4 is related to the instant application.
International Search Report and Written Opinion of the ISA for PCT/US2017/066157, dated Mar. 19, 2018. PCT/US2017/066157 is assigned to the same applicant as the instant application, Daylight Solutions, Inc.
Andersson Mats et al, "Flexible lock-in detection system based on synchronized computer plug-in boards applied in sensitive gas spectroscopy", Review of Scientific Instruments, AIP, Melville, NY, US, vol. 79, No. 11, Nov. 26, 2007.
B. Guo, et al., "Multi-Wavelength Mid-Infrared Micro-Spectral Imaging Using Semiconductor Lasers", Society for Applied Spectroscopy, vol. 57, No. 7, 2003, pp. 811-822.
Francesca Rosi et al, "Noninvasive Analysis of Paintings by Mid-infrared Hyperspectral Imaging", Angewandte Chemie International Edition, vol. 52., No. 20, May 10, 2013, pp. 5258-5261.
Phillips Mark C et al, Hyperspectral microscopy of explosives particles using an external cavity quantum cascade laser', Optical Engineering, Soc. of Photo-Optical Instrumentation Engineers, Bellingham, vol. 52, No. 6, Jun. 1, 2013, p. 61302.
Nikodem Michal et al, Remote mid-infrared sensing using chirped laser dispersion spectroscopy', Advanced Environmental, Chemical, and Biological Sensing Technologies VIII, SPIE, 1000 20th St. Bellingham WA 98225-6705 USA, vol. 8024, No. 1, May 13, 2011, pp. 1-7.
Extended European Search Report issued by the EPO for application No. 15737504.9, Daylight Solutions, Inc., Aug. 8, 2017. EPO Serial No. 15737504.9 is assigned to the same applicant as the instant application, Daylight Solutions, Inc.
Reply to Communication of EPO, filed in Application Serial No. 12794798.4, dated Jul. 20, 2018. EPO Application Serial No. 12794798.4 is related to the instant application.

* cited by examiner

INFRARED IMAGING MICROSCOPE USING TUNABLE LASER RADIATION

RELATED INVENTION

This application is a continuation application of U.S. application Ser. No. 14/353,487, filed Apr. 22, 2014 and entitled "INFRARED IMAGING MICROSCOPE USING TUNABLE LASER RADIATION". As far as permitted, the contents of U.S. application Ser. No. 14/353,487 are incorporated herein by reference.

U.S. application Ser. No. 14/353,487 is a 371 of PCT/US12/61987, filed Oct. 25, 2012 and entitled "INFRARED IMAGING MICROSCOPE USING TUNABLE LASER RADIATION". As far as permitted, the contents of PCT/US12/61987 are incorporated herein by reference.

PCT/US12/61987 claims priority on U.S. Provisional Application Ser. No. 61/551,147, filed Oct. 25, 2011 and entitled "INFRARED IMAGING MICROSCOPE USING TUNABLE LASER RADIATION FOR SPECTROSCOPIC ANALYSIS OF SAMPLES". As far as permitted, the contents of U.S. Provisional Application Ser. No. 61/551,147 are incorporated herein by reference.

GOVERNMENT SPONSORED DEVELOPMENT

The U.S. Government has rights in this invention pursuant to contract number NSF SBIR Phase I Award No. II-1046450 with the National Science Foundation.

BACKGROUND

Microscopes are often used to analyze a sample in order to evaluate certain details and/or properties of the sample that would not otherwise be visible to the naked eye. Additional information on the chemical properties of the sample can be obtained by illuminating and observing the sample with distinct wavelengths of monochromatic laser radiation. Samples that can be analyzed this way include human tissue, explosive residues, powders, liquids, solids, inks, and other materials. A human tissue sample may be analyzed for the presence of cancerous cells and/or other health related conditions. Other materials may be analyzed for the presence of explosive residues and/or other dangerous substances.

SUMMARY

The present invention is directed toward an imaging microscope for generating an image of a sample, the imaging microscope comprising a beam source, an image sensor and an imaging lens assembly. The beam source emits a temporally coherent illumination beam, the illumination beam including a plurality of rays that are directed at the sample. The image sensor converts an optical image into an array of electronic signals. In one embodiment, the imaging lens assembly receives rays from the beam source that are transmitted through the sample and form an image on the image sensor. Alternatively, the imaging lens assembly can receive rays from the beam source that are reflected off of the sample to form the image on the image sensor.

In certain embodiments, the imaging microscope further comprises an illumination lens assembly that directs the illumination beam at the sample. The illumination lens assembly adjusts the illumination beam so that the illumination beam illuminates a two-dimensional illuminated area on the sample all at once. Additionally, in such embodiments, the image sensor includes a two-dimensional array of sensors.

In one embodiment, the beam source is a mid-infrared ("MIR") beam source and the illumination beam is at a beam wavelength that is within the MIR range. In this embodiment, the illumination lens assembly is refractive in the MIR range.

Additionally, in some embodiments, the illumination lens assembly directs the illumination beam at the sample without splitting and recombining the illumination beam.

Further, in one embodiment, the illumination lens assembly magnifies the illumination beam. Moreover, the illumination lens assembly can adjust the size of the illumination beam so that the illuminated area on the sample is at least approximately two hundred and fifty microns by two hundred and fifty microns.

In one embodiment, the imaging lens assembly includes a refractive lens that directs the rays received by the imaging lens assembly.

Additionally, in some embodiments, the imaging lens assembly receives the rays from a plurality of points on the sample and forms the image on the image sensor without splitting and recombining the received rays.

The present invention is further directed toward a method for generating an image of a sample, the method comprising the steps of emitting a temporally coherent illumination beam with a beam source, the illumination beam including a plurality of rays; directing the plurality of rays at the sample; converting an optical image into an array of electronic signals with an image sensor; receiving rays from the beam source that are transmitted through the sample with an imaging lens assembly; and forming an image on the image sensor with the rays received from the beam source by the imaging lens assembly that are transmitted through the sample.

Additionally and/or alternatively, the method can further comprise the steps of receiving rays from the beam source that are reflected off of the sample with the imaging lens assembly; and forming a second image on the image sensor with the rays received from the beam source by the imaging lens assembly that are reflected off of the sample.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
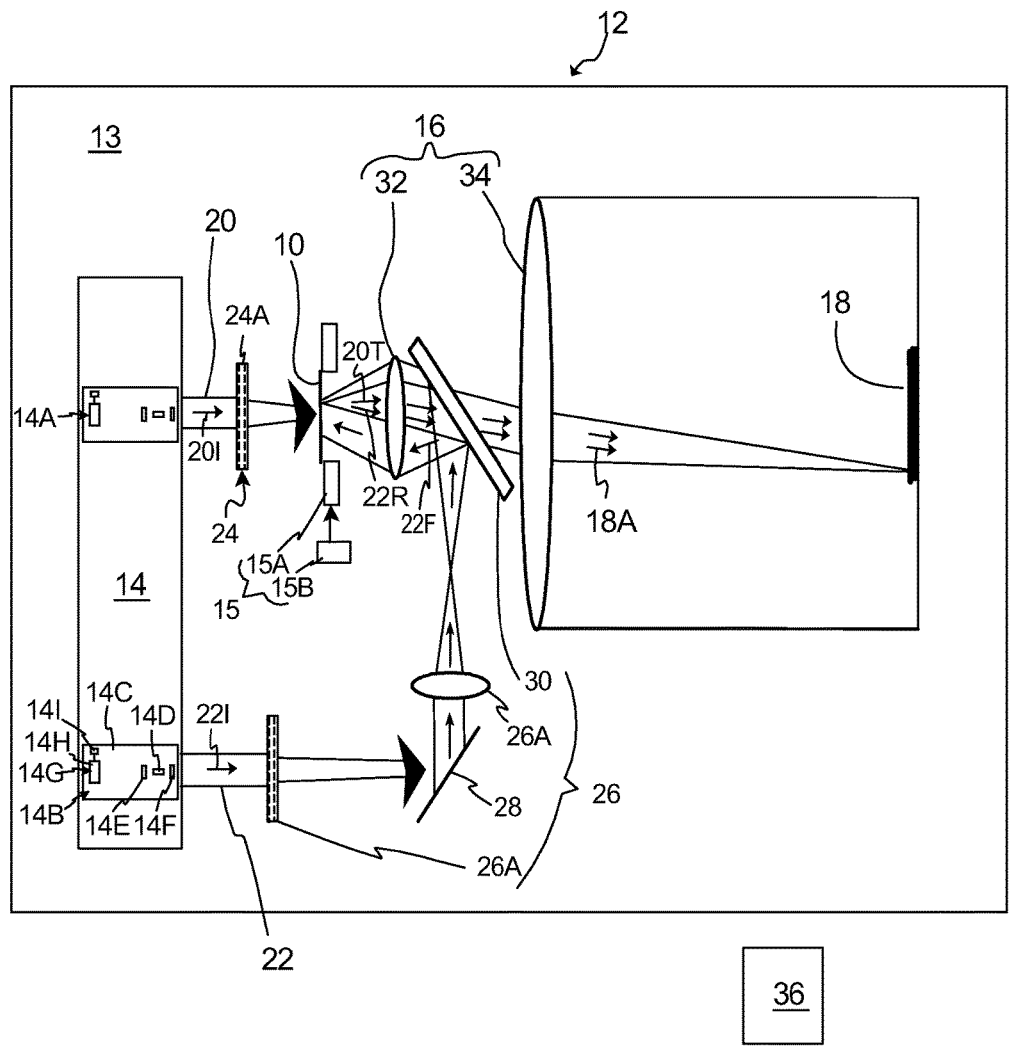
FIG. 1A is simplified schematic illustration of a sample and an embodiment of an imaging microscope having features of the present invention.

FIG. 1A is simplified schematic illustration of a sample 10 and a first embodiment of an imaging microscope 12 having features of the present invention. In particular, the imaging microscope 12 can be used to analyze and evaluate the various properties of the sample 10. For example, in one embodiment, the imaging microscope 12 is an infrared imaging microscope that uses tunable laser radiation to spectroscopically interrogate one or more samples 10 in order to analyze and identify the properties of the sample.

As an overview, the imaging microscope 12 is uniquely designed to inhibit potential complications from temporal and/or spatial coherence that may otherwise be present due to the use of laser radiation for image illumination. Moreover, the present invention provides such benefits without the potential drawbacks of complexity of manufacture and operation, increased size and time requirements, increased power consumption, high cost, and inefficiency.

The sample 10 can be a variety of things, including human tissue, animal tissue, plant matter, explosive residues, powders, liquids, solids, inks, and other materials commonly analyzed using Fourier transform infrared (FTIR) microscopes. More particularly, in certain non-exclusive applications, the sample 10 can be human tissue and the imaging microscope 12 can be utilized for rapid screening of the tissue sample 10 for the presence of cancerous cells and/or other health related conditions; and/or the imaging microscope 12 can be utilized in certain forensic applications such as rapid screening of the sample 10 for the presence of explosive residues and/or other dangerous substances. Additionally, when positioned substantially within the imaging microscope 12 for purposes of analysis, the sample 10 can be present by itself, or the sample 10 can be held in place using one or more slides, e.g., infrared transparent slides.

Further, the sample 10 can be thin enough to allow study through transmission of an illumination beam, e.g., an infrared illumination beam, through the sample 10 (i.e. in transmission mode), or the sample 10 can be an optically opaque sample that is analyzed through reflection of an illumination beam, e.g., an infrared illumination beam, by the sample (i.e. in reflection mode). For example, in the embodiment illustrated in FIG. 1A, the imaging microscope 12 can alternatively be utilized in both transmission mode and reflection mode.

In another embodiment, the imaging mircroscope 12 can be used in both transmission mode and reflection mode at the same time. For example, some samples 10 are transmissive to certain wavelengths and reflective to other wavelengths. As a more specific, non-exclusive example, light in the visible spectrum can be directed at the sample 10 for use in the transmission mode, and MIR light can be directed at the sample 10 for use in the reflection mode. Still alternatively, the imaging microscope 12 can be designed such that it only operates in one of transmission mode or reflection mode.

The design of the imaging microscope 12 can be varied. In the embodiment illustrated in FIG. 1A, the imaging microscope 12 includes a rigid frame 13, a temporally coherent beam source 14, a stage assembly 15 that retains the sample 10, an imaging lens assembly 16 (e.g., one or more lenses), and an image sensor 18 that converts an optical image into an array of electronic signals. The design of each of these components can be varied pursuant to the teachings provided herein.

In one embodiment, the beam source 14 (i) emits a temporally coherent, first illumination beam 20 that is usable for illuminating and analyzing the sample 10 in transmission mode; and/or (ii) emits a temporally coherent, second illumination beam 22 that is usable for illuminating and analyzing the sample 10 in reflection mode. The first illumination beam 20 is made up of a plurality of illumination rays 20I that are directed at the sample 10, and the second illumination beam 22 is made up of a plurality of illumination rays 22I that are directed at the sample 10. Each illumination beam 20, 22 can be emitted from the same beam source 14. Alternatively, each illumination beam 20, 22 can be emitted from a separate and distinct beam source. It should be noted that the use of the terms "first illumination beam" and "second illumination beam" is merely for ease of description, and either illumination beam 20, 22 can be referred to as the "first illumination beam" or the "second illumination beam".

In certain embodiments, the beam source 14 can include (i) a first laser source 14A that emits the first illumination beam 20, e.g., a first laser beam, and (ii) a second laser source 14B that emits the second illumination beam 22, e.g., a second laser beam. Alternatively, for example, the beam source 14 can be designed to include a single laser source with the appropriate beam directors.

Further, in one, non-exclusive embodiment, the beam source 14 is designed to provide illumination beams 20, 22 that are in the mid infrared ("MIR") range spectrum. More particularly, in some such embodiments, one or both of the laser sources 14A, 14B can be a mid-infrared (MIR) beam source that emits the first illumination beam 20 and/or the second illumination beam 22 that is at a beam wavelength that is within the MIR range. For example, one or both of the laser sources 14A, 14B can be any type of laser that is capable of generating radiation in the spectral region of between approximately two to twenty microns (2-20 µm). Moreover, in alternative embodiments, the laser sources 14A, 14B can be a pulsed laser and/or a continuous wave (CW) laser.

As provided herein, one or both of the laser sources 14A, 14B can be an external cavity laser that includes a laser frame 14C, a gain medium 14D, a cavity optical assembly 14E, an output optical assembly 14F, and a wavelength dependent ("WD") feedback assembly 14G.

The laser frame 14C provides a rigid support for the components of each laser source 14A, 14B. In one embodiment, the laser frame 14C for each laser source 14A, 14B is a single mechanical ground plane that provides structural integrity for the respective laser source 14A, 14B. In certain embodiments, the laser frame 14C is made of rigid material that has a relatively high thermal conductivity.

The design of the gain medium 14D can be varied pursuant to the teachings provided herein. In one, non-exclusive embodiment, the gain medium 14D for each laser directly emits the respective beams 20, 22 without any frequency conversion. As non-exclusive examples, one or both of the gain mediums 14D can be a Quantum Cascade (QC) gain medium, an Interband Cascade (IC) gain medium, or a mid-infrared diode. Alternatively, another type of gain medium 14D can be utilized.

In FIG. 1A, each gain medium 14D includes (i) a first facet that faces the respective cavity optical assembly 14E and the feedback assembly 14G, and (ii) a second facet that faces the output optical assembly 14F. In this embodiment, each gain medium 14D emits from both facets. In one embodiment, each first facet is coated with an anti-reflection ("AR") coating, and each second facet is coated with a reflective coating. The AR coating allows light directed from the gain medium 14D at the first facet to easily exit as a beam directed at the feedback assembly 14G; and allows the light beam reflected from the feedback assembly 14G to easily enter the gain medium 14D. The beams 20, 22 exit from the respective second facet. The partly reflective coating on the second facet of each gain medium 14D reflects at least some of the light that is directed at the second facet of each gain medium 14D back into the respective gain medium 14D. In one non-exclusive embodiment, the AR coating can have a reflectivity of less than approximately 2 percent, and the reflective coating can have a reflectivity of between approximately 2-95 percent.

In one embodiment, for each laser source 14A, 14B, (i) the reflective coating on the second facet of the gain medium 14D acts as a first end (output coupler) of an external cavity and the feedback assembly 14G (spaced apart from the gain medium 14D) defines a second end of the each external cavity. The term external cavity is utilized to designate that the WD feedback assembly 14G is positioned outside of the gain medium 14D.

The cavity optical assembly 14E is positioned between the gain medium 14D and the feedback assembly 14G along a lasing axis. The cavity optical assembly 14E collimates and focuses the beam that passes between these components. For example, each cavity optical assembly 14E can include one or more lens. For example, the lens can be an aspherical lens having an optical axis that is aligned with the respective lasing axis.

The output optical assembly 14F is positioned between the gain medium 14D and the beam redirector assembly 28 in line with the lasing axis to collimate and focus the beam 22 that exits the second facet of the gain medium 14D. For example, each output optical assembly 14F can include one or more lens that are somewhat similar in design to the lens of the cavity optical assemblies 14E.

The WD feedback assembly 14G reflects the beam back to the gain medium 14D, and is used to precisely select and adjust the lasing frequency of the external cavity and the wavelength of the pulses of light. Stated in another fashion, the WD feedback assembly 14G is used to feed back to the gain medium 14D a relatively narrow band wavelength which is then amplified in the respective gain medium 14D. In this manner, the respective beams 20, 22 may be tuned with the WD feedback assembly 14G without adjusting the respective gain medium 14D. Thus, with the external cavity arrangements disclosed herein, the WD feedback assembly 14G dictates what wavelength will experience the most gain and thus dominate the wavelength of the beams 20, 22.

In one embodiment, the WD feedback assembly 14G includes a diffraction grating 14H and a grating mover 14I that selectively moves (e.g. rotates) the grating 14H to adjust the lasing frequency of the gain medium 14D and the wavelength of the respective beams 20, 22. The grating 14H can be continuously monitored with an encoder that provides for closed loop control of the grating mover 14I. With this design, the wavelength of the respective beam 20, 22 can be selectively adjusted in a closed loop fashion so that the sample 10 can be imaged at many different, precise, selectively adjustable wavelengths throughout a portion or the entire MIR spectrum.

Once the beam source 14 has emitted the first illumination beam 20 and/or the second illumination beam 22, the illumination beam 20, 22 is directed toward the sample 10 so that the sample 10 may be properly and effectively illuminated by the illumination beam 20, 22. For example, when the imaging microscope 12 is operating in transmission mode, the first illumination beam 20 (including the plurality of illumination rays 20I) is directed toward the sample 10 in order to properly and effectively illuminate the sample 10. In this example, the rays that are transmitted through the sample 10 are referred to as transmitted rays 20T. In another example, when the imaging microscope 12 is operating in reflection mode, the second illumination beam 22 (including a plurality of illumination rays 22I) is directed toward the sample 10 in order to properly and effectively illuminate the sample 10. In this example, the rays that are reflected off of the sample 10 are referred to as reflected rays 22R.

In the embodiment illustrated in FIG. 1A, when operating in transmission mode, the first illumination beam 20 exiting the beam source 14 is directed with a transmission illumination lens assembly 24 toward and impinging on the sample 10. In one embodiment, the transmission illumination lens assembly 24 can include one or more refractive lenses 24A (only one is illustrated in phantom) that direct the first illumination beam 20 at the sample 10. Moreover, the transmission illumination lens assembly 24 can be refractive in the MIR range.

In certain embodiments, the transmission illumination lens assembly 24 adjusts the first illumination beam 20 so that the first illumination beam 20 at least illuminates a transmission illuminated area 10A (illustrated in FIG. 1B) on the sample 10 all at once that is two-dimensional 10. Stated in another fashion, the transmission illumination lens assembly 24 adjusts the first illumination beam 20 so that the first illumination beam 20 at least illuminates a two-dimensional transmission illuminated area 10A simultaneously on the sample 10. With this design, the entire sample 10 or a large portion of the sample 10 is simultaneously illuminated and can be examined at the same time. This expedites the analysis of the sample 10.

In certain embodiments, the transmission illumination lens assembly 24 can be used to transform, i.e. to increase (magnify) or decrease, the size of the first illumination beam 20 to match and simultaneously illuminate a desired transmission illuminated area 10A on the sample 10. Stated another way, the transmission illumination lens assembly 24 can be used to condition and focus the first illumination beam 20 so that the first illumination beam 20 has the correct or desired size and beam profile on the sample 10. In certain embodiments, size of the transmission illuminated area 10A of the sample 10 is tailored to correspond to the design of the image sensor 18 and the imaging lens assembly 16.

Figure 1B:
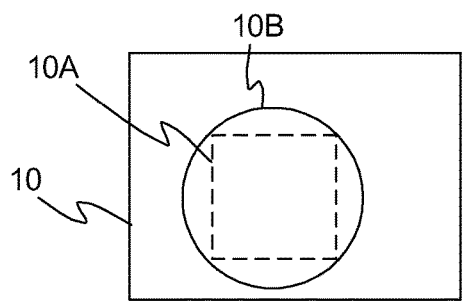
FIG. 1B is a simplified schematic illustration of the sample illustrated in FIG. 1A, including a transmission illuminated area.

FIG. 1B is a simplified schematic illustration of the sample 10 illustrated in FIG. 1A, including the transmission illuminated area 10A (illustrated with a box in phantom) that is simultaneously illuminated. In certain embodiments, the two-dimensional transmission illumination area 10A is rectangular shaped. More particularly, in some such embodiments, the two-dimensional transmission illumination area 10A can be square shaped. For example, in alternative non-exclusive embodiments, the transmission illumination lens assembly 24 can adjust the size of the first illumination beam 20 so that the transmission illuminated area 10A that is simultaneously illuminated on the sample 10 is at least approximately (i) two hundred and fifty microns (250 μm) by two hundred and fifty microns (250 μm); (ii) five hundred microns (500 μm) by five hundred microns (500 μm); (iii) seven hundred and fifty microns (750 μm) by seven hundred and fifty microns (750 μm); (iv) one millimeter (1 mm) by one millimeter (1 mm); (v) one and a half millimeter (1.5 mm) by one and a half millimeter (1.5 mm); and (vi) two millimeters (2 mm) by two millimeters (2 mm); or (vii) three millimeters (3 mm) by three millimeters (3 mm). Still alternatively, the transmission illuminated area 10A can have a non-square shape. As non-exclusive examples, the transmission illumination lens assembly 24 can adjust the size of the first illumination beam 20 so that the transmission illuminated area 10A on the sample 10 is at least approximately two hundred microns (200 μm) by three hundred microns (300 μm); or (iii) fifty microns (50 μm) by five hundred microns (500 μm). Alternatively, the transmission illumination lens assembly 24 can adjust the size of the first illumination beam 20 so that the transmission illuminated area 10A on the sample 10 has a different size or shape than the examples provided above. For example, in alternative, non-exclusive embodiments, the transmission illumination lens assembly 24 can adjust the size of the first illumination beam 20 so that the transmission illuminated area 10A is at least approximately 20, 30, 30, 50, 60, 70, 80, 90, or 100 millimeters squared. Still alternatively, for example, the two-dimensional transmission illuminated area 10A can be circular or oval shaped.

Further, as shown in FIG. 1B, the transmission illuminated area 10A is really an effectively illuminated area (has substantially uniform intensity) that exists within a larger, fully illuminated area 10B that is simultaneously illuminated by the first illumination beam 20 (illustrated in FIG. 1A). As illustrated, the fully illuminated area 10B can be substantially circular shaped and can be the result of the first illumination beam 20 having a substantially circular shaped cross-section. Alternatively, the first illumination beam 20, and thus the fully illuminated area 10B can have another shape.

Moreover, referring back to FIG. 1A, the transmission illumination lens assembly 24 transforms the size and profile of the first illumination beam 20 as desired without splitting the illumination rays 20I of the first illumination beam 20 into multiple paths that, if recombined, can cause interference at the sample 10. Stated another way, the transmission illumination lens assembly 24 directs the first illumination beam 20 at the sample 10 without splitting and recombining the illumination rays 20I of the first illumination beam 20.

Alternatively, in another embodiment, if the first illumination beam 20 has sufficient extent to allow illumination of the desired area size of the sample 10, then the imaging microscope 12 can be designed without the transmission illumination lens assembly 24, and the first illumination beam 20 can be directly shined onto the sample 10.

In the embodiment illustrated in FIG. 1A, the imaging microscope 12 also can include a reflection illumination lens assembly 26 for directing the second illumination beam 22 at the sample 10 when operating in reflection mode. In one embodiment, the reflection illumination lens assembly 26 includes one or more lenses 26A, a redirector 28, e.g., a mirror, and a transmitter-redirector 30, e.g., a beam splitter. In this embodiment, one or more of the lenses 26A of the reflection illumination lens assembly 26 can be refractive in the MIR range. In the non-exclusive embodiment illustrated in FIG. 1A, the lens assembly 26 includes two, spaced apart lenses 26A.

Additionally, in certain embodiments, the reflection illumination lens assembly 26 adjusts the second illumination beam 22 so that the second illumination beam 22 at least illuminates a reflection illuminated area 10C (illustrated in FIG. 1C) on the sample 10 all at once that is two-dimensional. Stated in another fashion, the reflection illumination lens assembly 26 adjusts the second illumination beam 22 so that the second illumination beam 22 illuminates a two-dimensional reflection illuminated area 10C simultaneously on the sample 10. With this design, the entire sample 10 or a large portion of the sample 10 is simultaneously illuminated and can be examined at the same time. This expedites the analysis of the sample 10. In certain embodiments, the reflection illumination lens assembly 26 conditions the second illumination beam 22 to allow for the broad illumination of the reflection illuminated area 10C through a first lens 32 of the imaging lens assembly 16. In this embodiment, the same first lens 32 is used direct the second illumination beam 22 at the sample 10 and is used as the objective for the beams reflected off the sample 10.

In certain embodiments, the reflection illumination lens assembly 26 can be used to transform, i.e. to increase (magnify) or decrease, the size of the second illumination beam 22 to match a desired reflection illuminated area 10C on the sample 10. Stated another way, the reflection illumination lens assembly 26 can be used to condition and focus the second illumination beam 22 so that the second illumination beam 22 has the desired beam profile on the sample 10.

Figure 1C:
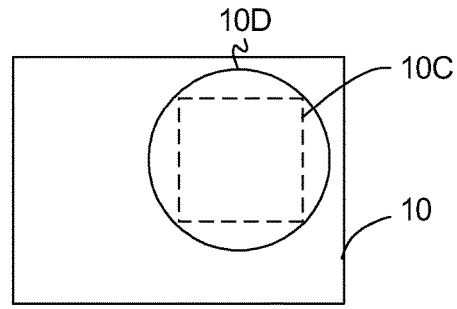
FIG. 1C is a simplified schematic illustration of the sample illustrated in FIG. 1A, including a reflection illuminated area.

FIG. 1C is a simplified schematic illustration of the sample 10 including the reflection illuminated area 10C. In certain embodiments, the two-dimensional reflection illumination area 10C is rectangular shaped. More particularly, in some such embodiments, the two-dimensional reflection illumination area 10C can be square shaped. For example, in alternative, non-exclusive embodiments, the reflection illumination lens assembly 26 can adjust the size of the second illumination beam 22 so that the reflection illuminated area 10C on the sample 10 is at least approximately (i) two hundred and fifty microns (250 μm) by two hundred and fifty microns (250 μm); (ii) five hundred microns (500 μm) by five hundred microns (500 μm); (iii) seven hundred and fifty microns (750 μm) by seven hundred and fifty microns (750 μm); (iv) one millimeter (1 mm) by one millimeter (1 mm); (v) one and a half millimeter (1.5 mm) by one and a half millimeter (1.5 mm); and (vi) two millimeters (2 mm) by two millimeters (2 mm); or (vii) three millimeters (3 mm) by three millimeters (3 mm). Still alternatively, the reflection illuminated area 10C can have a non-square shape. As non-exclusive examples, the transmission illumination lens assembly 24 can adjust the size of the first illumination beam 20 so that the transmission illuminated area 10A on the sample 10 is at least approximately two hundred microns (200 μm) by three hundred microns (300 μm); or (iii) fifty microns (50 μm) by five hundred microns (500 μm). Alternatively, the reflection illumination lens assembly 26 can adjust the size of the second illumination beam 22 so that the reflection illuminated area 10C on the sample 10 has a different size or shape than the examples provided above. For example, in alternative, non-exclusive embodiments, the reflection illumination lens assembly 26 can adjust the size of the second illumination beam 22 so that the reflection illuminated area 10C is at least approximately 20, 30, 30, 50, 60, 70, 80, 90, or 100 millimeters squared. Still alternatively, for example, the two-dimensional reflection illuminated area 10C can be circular or oval shaped.

Further, as shown in FIG. 1C, the reflection illuminated area 10C can be an effectively illuminated area (has substantially uniform intensity) that exists within a larger, fully illuminated area 10D that is illuminated by the second illumination beam 22 (illustrated in FIG. 1A). As illustrated, the fully illuminated area 10D can be substantially circular shaped and can be the result of the second illumination beam 22 having a substantially circular shaped cross-section. Alternatively, the second illumination beam 22, and thus the fully illuminated area 10C can have another shape.

Referring back to FIG. 1A, in certain embodiments, the reflection illumination lens assembly 26 transforms the size and profile of the second illumination beam 22 as desired without splitting and recombining the illumination rays 22I into multiple paths that, if recombined, can cause interference at the sample 10. Stated another way, the reflection illumination lens assembly 26 directs the illumination rays 22I of the second illumination beam 22 at the sample 10 without splitting and recombining the illumination rays 22I.

Additionally, in alternative embodiments, the reflection illumination lens assembly 26 can be positioned such that the second illumination beam 22 passes through the reflection illumination lens assembly 26 before and/or after the second illumination beam 22 is redirected by the redirector 28.

The redirector 28 is utilized to initially redirect the second illumination beam 22 so that the second illumination beam 22 can be properly directed toward a side (e.g. the bottom or the top depending on the design) of the sample 10 that will reflect the second illumination beam 22 toward the imaging lens assembly 16. The design of the redirector 28 can be varied. In one embodiment, the redirector 28 can be a mirror (reflective in the desired wavelength spectrum) which is positioned so as to redirect the path of the second illumination beam 22 by approximately ninety degrees. Alternatively, the redirector 28 can have a different design and/or the redirector 28 can be positioned so as to redirect the path of the second illumination beam 22 by greater than or less than approximately ninety degrees. Still alternatively, the redirector 28 can include a curved mirror that conditions the second illumination beam 22 (i) to complement the reflection illumination lens assembly 26, or (ii) to allow for the elimination of a portion or all of the reflection illumination lens assembly 26.

Moreover, in reflection mode, in FIG. 1A, the second illumination beam 22 is directed at the sample 10 with the transmitter-redirector 30 to avoid multiple beam paths, and to decrease the number of paths the reflected or scattered second illumination beam 22 can take when traveling from the sample 10 to the image sensor 18. The design of the transmitter-redirector 30 can be varied to suit the specific requirements of the imaging microscope 12. In certain embodiments, the transmitter-redirector 30 can be a beam splitter, e.g., a fifty percent (50%) beam splitter, which redirects a first portion 22F of the illumination rays 22I of the second illumination beam 22 toward the sample 10, and transmits a second portion (not shown) of the illumination rays 22I of the second illumination beam 22. The second portion of the second illumination beam 22 is subsequently directed away from the system and not used by the imaging microscope 12. It should be noted that the second (or discarded) portion of the second illumination beam 22 that is generated from this first pass through the transmitter-redirector 30 is not shown in FIG. 1A for purposes of clarity.

With the second illumination beam 22 being redirected by the transmitter-redirector 30 before impinging on the sample 10, as provided above, the reflection illumination lens assembly 26 can be used to transform the second illumination beam 22 so that it provides illumination for the two-dimensional reflection illuminated area 10C across the sample 10, instead of being focused to a point by the first lens 32 of the imaging lens assembly 16. In certain embodiments, the transmitter-redirector 30 can be made from a variety of infrared transmissive materials, such as ZnSe or Ge, or other materials. Additionally, the transmitter-redirector 30 can be a plano-piano beam splitter, with one side anti-reflection (AR) coated, and the other coated or uncoated for partial reflectivity. The transmitter-redirector 30 can also provide lensing action for transforming the second illumination beam 22 as desired. The transmitter-redirector 30 can also incorporate design elements to eliminate first and second surface interference effects due to the coherent nature of the illumination beam 22. As non-exclusive examples, design elements that would reduce the surface interference effects include anti-reflective coatings (for the wavelength of the beam), wedged elements, and/or curved optical surfaces.

The stage assembly 15 retains the sample 10, and can be used to properly position the sample 10. For example, the stage assembly 15 can include a stage 15A that retains sample 10, and stage mover 15B that selectively moves the stage 15A and the sample 10. For example, the stage mover 15B can include one or more actuators, or stage 15A can be manually positioned.

When the illumination rays 20I of the first illumination beam 20 are illuminating the sample 10, at least a portion of the transmitted rays 20T that are transmitted through the sample 10 are received by the imaging lens assembly 16 and imaged on the image sensor 18. Somewhat similarly, when the illumination rays 22I of the second illumination beam 22 are illuminating the sample 10, at least a portion of the reflected rays 22R that are reflected from the sample 10 are received by the imaging lens assembly 16 and imaged on the image sensor 18. Stated in another fashion, the imaging lens assembly 16 receives at least a portion of the transmitted rays 20T that are transmitted through the sample 10, or at least a portion of the reflected rays 22R that are reflected from the sample 10 and forms an image on the image sensor 18.

As utilized herein, the term "imaged rays" 18A shall mean the transmitted rays 20T or the reflected rays 22R that are collected by the imaging lens assembly 16 and imaged on the image sensor 18. As provided herein, the imaging lens assembly 16 receives the imaged rays 18A from a plurality of points on the sample 10 and forms the image on the image sensor 18 without splitting and recombining the imaged rays 18A. This reduces interference effects at the image sensor 18.

In one embodiment, the imaging lens assembly 16 can include a first lens 32 and a second lens 34 that cooperate to form an image of the sample 10 on the image sensor 18. Alternatively, the imaging lens assembly 16 can include greater than two lenses or only one lens.

In one embodiment, the first lens 32 can be an objective lens that collects the imaged rays 18A, and focuses the imaged rays 18A on the image sensor 18. Moreover, as illustrated, the first lens 32 is positioned substantially between the sample 10 and the second lens 34. Additionally, in one embodiment, the second lens 34 can be a projection lens that projects the imaged rays 18A toward the image sensor 18. Moreover, as illustrated, the second lens 34 is positioned substantially between the first lens 32 and the image sensor 18. Further, in one embodiment, one or both of the lenses 32, 34 can be refractive in the MIR range or the wavelength of the illumination beam. Still further, one or both of the lenses 32, 34 can be a compound lens.

Each of the lenses 32, 34 can be types such as plano-convex, plano-concave, miniscus, and aspherical, as well as other types. For refractive lenses, materials such as ZnSe, Ge, chalcogenide glass, and other materials can be employed. Reflective lenses can be elliptical, paraboloid, or other shapes. The reflective surface can be dichroic coating, Au, Ag, or other surface types. In one non-exclusive embodiment, the first lens 32, i.e. the objective lens, can be a 10 millimeter diameter, 10 millimeter focal length, plano-aspheric Ge lens, and the second lens 34, i.e. the projection lens, can be a 20 millimeter diameter, 50 millimeter focal length plano-convex Ge lens. This provides a magnification of 5× at the image sensor 18, allowing an image resolution of 3.4 µm for a 17 µm pitch pixel. It should be noted that the resolution of the image sensor 18 is described in more detail below. Alternatively, other lenses are possible that allow different magnifications. Single and compound lenses that are designed to be achromats over the desired infrared spectral region can also be used.

Further, as shown in the embodiment illustrated in FIG. 1A, the transmitted rays 20T or the reflected rays 22R that are collected by the first lens 32 are directed at the transmitter-redirector 30 that is positioned between the first lens 32 and the second lens 34 in this example. In this embodiment, if the transmitter-redirector 30 is a fifty percent (50%) beam splitter, the transmitted rays 20T or the reflected rays 22R that are collected by the first lens 32 are split into (i) the imaged rays 18A that are imaged on the image sensor 18, and (ii) discarded rays that are directed away from the image sensor 18.

The image sensor 18 senses the imaged rays 18A and converts the imaged rays 18A (the optical image) into an array of electronic signals that represents an image of the sample.

In certain embodiments, the image sensor 18 includes a two dimensional array of photosensitive elements (pixels) (e.g. a focal plane array (FPA)) that are sensitive to the wavelength of the illumination beams 20I, 22I that are used to construct a two-dimensional image. The spacing between the pixel elements is referred to as the pitch of the array. For example, if the illumination beams 20I, 22I are in the MIR range, the image sensor 18 is a MIR imager. More specifically, if the illumination beams 20I, 22I are in the infrared spectral region from two to twenty µm, the image sensor 18 is sensitive to the infrared spectral region from two to twenty µm.

Examples of suitable infrared image sensors 18 include (i) vanadium oxide (VO$_x$) microbolometer arrays such as the FPA in the FLIR Tau 640 infrared camera that are typically responsive in the seven to fourteen µm spectral range; (ii) mercury cadmium telluride (HgCdTe or MCT) arrays such as those in the FLIR Orion SC7000 Series cameras that are responsive in the 7.7 to 11.5 µm spectral range; (iii) indium antimonide (InSb) arrays such as those in the FLIR Orion SC7000 Series cameras that are responsive in the 1.5 to 5.5 µm spectral range; (iv) indium gallium arsenide (InGaAs); (v) uncooled hybrid arrays involving VOx and other materials from DRS that are responsive in the two to twenty µm spectral range; or (vi) any other type of image sensor 18 that is designed to be sensitive to infrared light in the two to twenty µm range and has electronics allowing reading out of each element's signal level to generate a two-dimensional array of image information.

In alternative, non-exclusive embodiments, the pixel dimensions for the image sensor 18 can be five, eight, ten, twelve, thirteen, seventeen, twenty-five, thirty-five, and fifty µm per side, for example. Additionally, the pixels can be square, rectangular, or any other shape. As non-exclusive examples, the image sensor 18 can be designed to include a 50×50 array of pixels; a 100×100 array of pixels, a 200×200 array of pixels, a 320×240 array of pixels, a 400×400 array of pixels, a 500×500 array of pixels, a 640×480 array of pixels, or another sized array of pixels. Further, the arrays can be square or rectangular, or masked for a specific shape, either physically or through data processing.

In one non-exclusive example, the image sensor 18 can be a microbolometer array having a pixel pitch of 17 µm and a frame size of 640×512, resulting in a physical FPA size of 10.88 mm×8.7 mm. With five times magnification for the first lens 32, i.e. the objective lens, and the second lens 34, i.e. the projection lens, this results in an area imaged at the sample 10 of 2.2 mm×1.7 mm. Therefore, the size of the illumination beam 20, 22 should be sufficient to provide illumination across this area on the sample 10. If the 95% beam diameter is at least three millimeters, the illumination beam 20, 22 can provide appropriate illumination across the sample 10 as necessary.

In certain embodiments, the present invention allows the use of lower priced, room temperature image sensors 18, e.g., FPAs such as microbolometers. These FPAs require lower power consumption and have smaller overall volume, such that field-deployable and commercial instruments become more practical. Additionally, the use of tunable infrared lasers, such as QC lasers 14A, 14B, generates enough light to allow the use of these less-sensitive room temperature FPAs. In particular, the use of such an FPA allows for a complete image to be captured at each wavelength. Moreover, due to the higher power provided by such lasers 14A, 14B, less signal averaging is thus required, meaning that it is possible to rapidly tune the laser 14A, 14B and then build up a spectral image cube for analysis in tens of seconds, rather than the minutes generally required for FTIR microscopes.

As a non-exclusive example, tunable infrared lasers, such as QC lasers 14A, 14B, can generate between approximately 0.2 mW to 20 mW at a single wavelength. This will provide enough intensity to overcome the background pixel noise level of less-sensitive microbolometer arrays.

As provided herein, in certain embodiments, the imaging device 12 is designed so that (i) the illumination rays 20I generated by the first laser source 14A are directed at the sample 10 without splitting and recombining the illumination rays 20I, e.g. illumination rays 20I follow a single path to the sample 10; (ii) the illumination rays 22I generated by the second laser source 14B are directed at the sample 10 without splitting and recombining the illumination rays I, e.g. the illumination rays 22I follow a single path to the sample 10; and (iii) the imaged rays 18A travel from the sample 10 to the image sensor 18 without splitting and recombining the imaged rays 18A, e.g. the imaged rays 18A follow a predominantly single path to the image sensor 18. With this design, potential drawbacks from the use of a temporally coherent light source, such as certain interference effects, e.g., interference fringes, can be avoided. Spatial coherence occurs when the variation in the electric field wavefront of the light is similar across an illuminated area. The effects on imaging of spatial coherence include speckle and diffraction. Temporal coherence means that the electric field of the light exhibits the same oscillation pattern over a significant period of time, such as a sinusoidal oscillation. Whereas spatial coherence can occur even for waves that do not have a regular, sinusoidal electric field, temporal coherence requires a periodic, regular oscillation in the electric field. This presents a particular challenge for imaging because laser light originating from a single source, which is subsequently split such that portions of the laser light travel different paths, and which is then recombined, can exhibit interference effects. For example, the effects of temporal coherence can be seen in terms of interference fringes. More particularly, light emanating from an illuminating laser that is split and allowed to travel two separate paths before being rejoined at a sample, can result in interference fringes being evident on an illuminated sample. As detailed herein, the present design effectively enables such potential drawbacks to be avoided.

Additionally, as illustrated in FIG. 1A, the imaging microscope 12 can further include and/or be coupled to a processing device 36 that includes one or more processors and/or storage devices. For example, the processing device 36 can receive information from the pixels of the image sensor 18 and generate the image of the sample. Further, the processing device 36 can control the operation of the laser sources 14A, 14B and the stage assembly 15.

Figure 2:
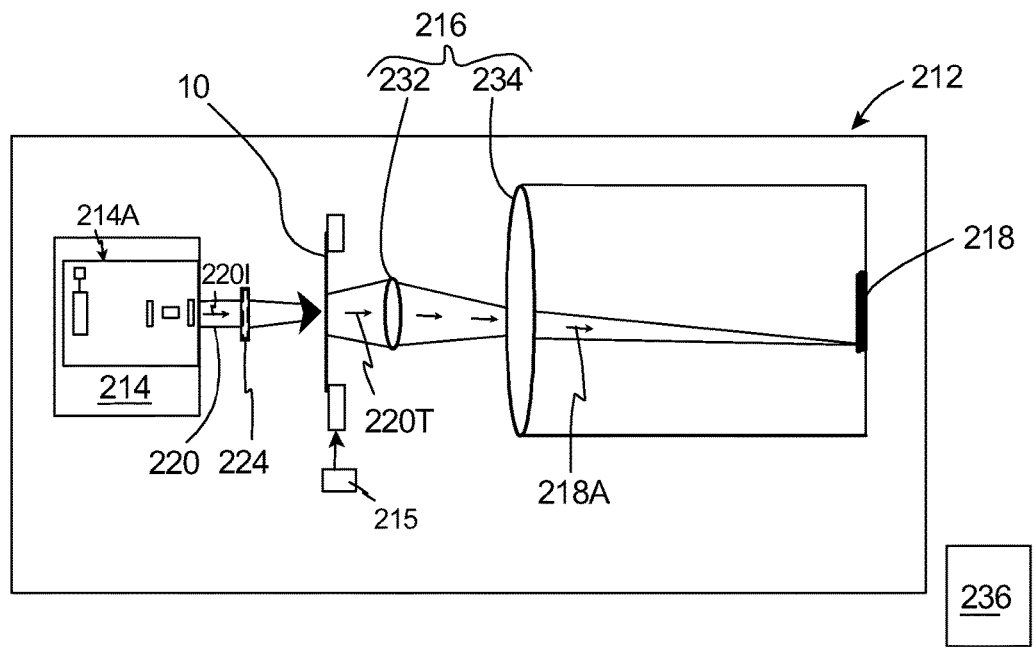
FIG. 2 is a simplified schematic illustration of the sample and another embodiment of an imaging microscope having features of the present invention.

FIG. 2 is a simplified schematic illustration of the sample 10 and another embodiment of an imaging microscope 212 having features of the present invention. The imaging microscope 212 illustrated in FIG. 2 is somewhat similar to the imaging microscope 12 illustrated and described above in relation to FIG. 1A. For example, the imaging microscope 212 includes a temporally coherent beam source 214 that includes a laser source 214A, a stage assembly 215, an imaging lens assembly 216, an image sensor 218, and a processing device 236 that are somewhat similar to the corresponding components illustrated and described above in relation to FIG. 1A. However, in the embodiment illustrated in FIG. 2, the imaging microscope 212 is designed to only function in the transmission mode with an in line format, and the imaging microscope 212 does not function in the reflection mode.

In this embodiment, because the imaging microscope 212 is only designed to function in transmission mode, the imaging microscope 212 can be designed without the illumination optics that are included in the embodiment illustrated in FIG. 1A to enable the imaging microscope 12 to alternatively function in reflection mode. Accordingly, in this embodiment, the imaging microscope 212 does not include the reflection illumination lens assembly 26, the redirector 28 and the transmitter-redirector 30 that are at least optionally included in the embodiment illustrated in FIG. 1A.

Similar to the previous embodiment, the temporally coherent beam source 214 emits a temporally coherent illumination beam 220 that includes a plurality of illumination rays 220I for illuminating and analyzing the sample 10 in transmission mode.

The transmission illumination lens assembly 224 can again adjust the illumination beam 220 so that the illumination beam 220 illuminates a two dimensional transmission illuminated area, e.g., the transmission illuminated area 10A illustrated in FIG. 1B, on the sample 10 all at once.

Subsequently, at least some of the transmitted rays 220T that are transmitted through the sample 10 are then directed toward the image sensor 218 with the imaging lens assembly 216. The transmitted rays 220T collected by the imaging lens assembly 216 and directed at the image sensor 218 are referred to as imaged rays 218A. As with the previous embodiment, the imaging lens assembly 216 can include a first lens 232 and a second lens 234 that cooperate to form an image of the sample 10 on the image sensor 218. Alternatively, the imaging lens assembly 216 can include greater than two lenses or only one lens.

Figure 3:
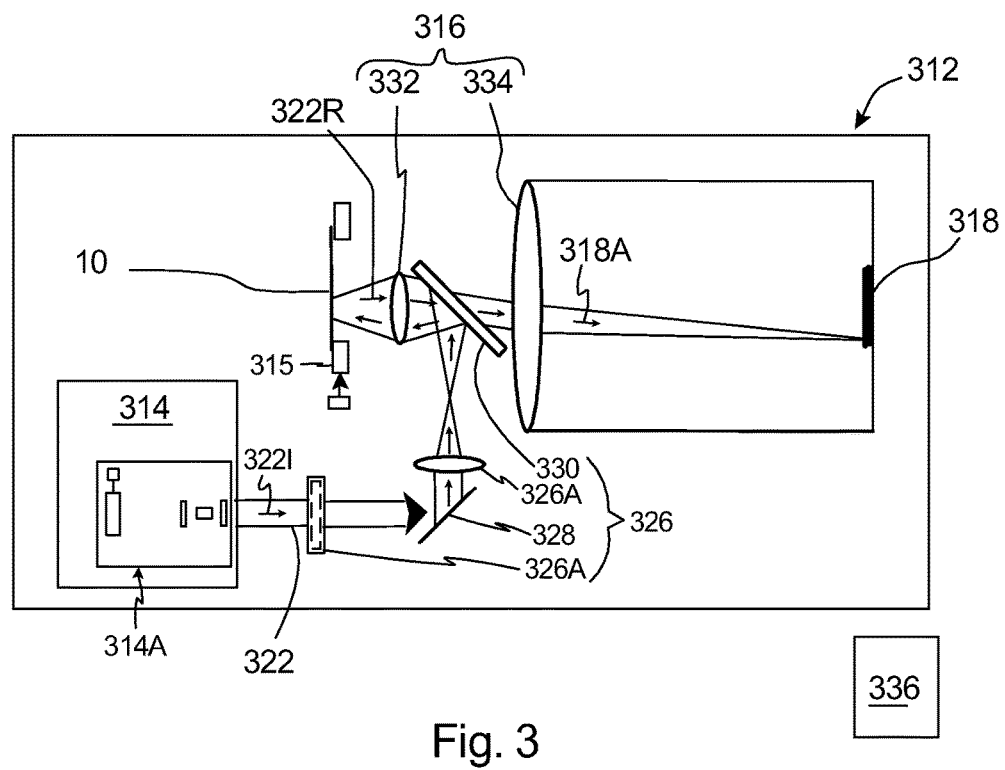
FIG. 3 is a simplified schematic illustration of the sample and still another embodiment of an imaging microscope having features of the present invention.

FIG. 3 is a simplified schematic illustration of the sample 10 and still another embodiment of an imaging microscope 312 having features of the present invention. The imaging microscope 312 illustrated in FIG. 3 is somewhat similar to the imaging microscope 12 illustrated and described above in relation to FIG. 1A. For example, the imaging microscope 312 includes a temporally coherent beam source 314 with a laser source 314B, a stage assembly 315, an imaging lens assembly 316, an image sensor 318, and a processing device 336 that are somewhat similar to corresponding components illustrated and described above in relation to FIG. 1A. However, in the embodiment illustrated in FIG. 3, the imaging microscope 312 is designed to only function in the reflection mode, and the imaging microscope 312 does not function in the transmission mode. More particularly, because the imaging microscope 312 is only designed to function in reflection mode, the imaging microscope 312 can be designed without the transmission illumination lens assembly 24 that is at least optionally included in the embodiment illustrated in FIG. 1A.

Similar to the previous embodiment, the temporally coherent beam source 314 emits a temporally coherent illumination beam 322 that includes a plurality of illumination rays 322I for illuminating and analyzing the sample 10 in reflection mode.

The reflection illumination lens assembly 326 can again adjust the illumination beam 322 so that the illumination beam 322 illuminates a two dimensional reflection illuminated area, e.g., the reflection illuminated area 10C illustrated in FIG. 1C, on the sample 10 all at once.

Subsequently, at least some of the reflected rays 322R that are reflected from the sample 10 are then directed toward the image sensor 318 with the imaging lens assembly 316. The reflected rays 322R collected by the imaging lens assembly 316 and directed at the image sensor 318 are referred to as imaged rays 318A. As with the previous embodiment, the imaging lens assembly 316 can include a first lens 332 and a second lens 334 that cooperate to form an image of the sample 10 on the image sensor 318. Alternatively, the imaging lens assembly 316 can include greater than two lenses or only one lens.

In this embodiment, the reflection illumination lens assembly 326 again includes one or more lenses 326A (two are illustrated in FIG. 3), a redirector 328, and a transmitter-redirector 330 that are similar to the corresponding components described above and illustrated in FIG. 1A.

Figure 4:
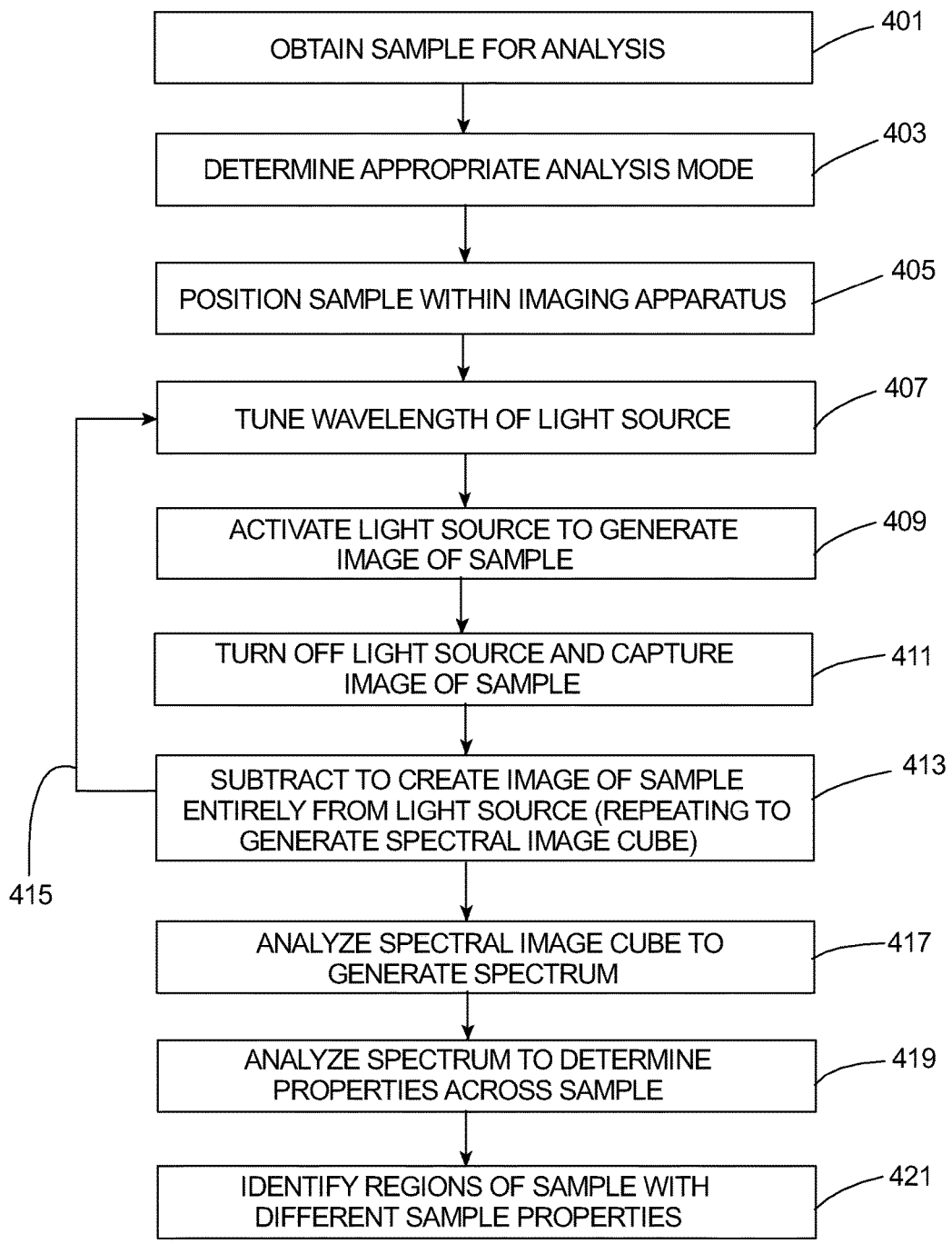
FIG. 4 is a simplified flowchart demonstrating the use of an imaging microscope having features of the present invention to analyze a sample.

FIG. 4 is a simplified flowchart demonstrating the use of an imaging microscope having features of the present invention to analyze a sample. Although it is disclosed that the steps employed in the use of the imaging microscope are performed in a certain order, it should be noted that the steps can be performed in a different order, and/or one or more of the steps can be combined or eliminated without altering the overall intended scope and breadth of the present invention.

Initially, in step 401, a sample is obtained that it is desired to analyze utilizing the imaging microscope. Additionally, in step 403, the sample is visually inspected to determine whether the sample is appropriate for analysis in transmission mode or reflection mode. In particular, if the sample is thin and/or substantially transparent, then the sample is more appropriate for analysis in the transmission mode. Alternatively, if the sample is substantially opaque such that the illumination beam will likely be reflected by the sample, then the sample is more appropriate for analysis in the reflection mode.

In step 405, the sample is positioned near a temporally coherent beam source within the imaging microscope for analysis. Further, in step 407, the temporally coherent beam source of the imaging microscope, e.g., a laser source that operates in the infrared spectral region between two and twenty μm, is tuned to a particular wavelength.

Then, in step 409, the beam source is activated in order to generate a first image of the sample. As disclosed herein above, the beam source illuminates a two-dimensional area of the sample all at once, which is then imaged onto an image sensor, e.g., an image sensor that is responsive somewhere in the infrared spectral region from two to twenty µm, through one or more lenses, e.g., an objective lens and a projection lens. The illumination provided by the beam source is necessarily controlled so that a set of single path rays from the illumination beam traverses a single path before impinging on the sample and between the sample and the image sensor. Stated another way, the illumination provided by the beam source is controlled so that the set of single path rays are not split and recombined between the beam source and the sample, and the set of single path rays are not split and recombined between the sample and the image sensor.

If it has been determined that the imaging microscope should be appropriately utilized in transmission mode for the particular sample being analyzed, then the beam source should be activated so as to substantially directly illuminate the sample. Alternatively, if it has been determined that the imaging microscope should be appropriately utilized in reflection mode for the particular sample being analyzed, then the beam source should be activated so as to illuminate the back side of the sample utilizing the appropriate optical elements. It should be noted that if an insufficient image is generated with the imaging microscope in the mode chosen, i.e. either transmission mode or reflection mode, then the alternative mode can be activated to provide a more sufficient and/or appropriate image generated from the sample.

In step 411, the beam source is deactivated, i.e. is turned off, and a second image of the sample is captured by the image sensor without the use of the temporally coherent beam source. Then, in step 413, the second image of the sample acquired without the beam source is subtracted from the first image of the sample acquired utilizing the beam source to create a differential image of the sample that consists entirely of transmitted or reflected light from the beam source.

Subsequently, in step 415, the process of steps 407 through 413 is repeated as necessary with the beam source tuned to additional appropriate wavelengths. This creates a set of images at different wavelengths of the beam source, known as a spectral image cube, or hypercube. Then, in step 417, the spectral image cube can be analyzed at each pixel or set of pixels to generate a transmission or reflection spectrum. Next, in step 419, the spectrum can then be analyzed to determine properties of the sample at different positions across the sample. These properties can be chemical, structural, or phase, for example. Finally, in step 421, the analyzed data is then used to create a two-dimensional map of sample properties that can be visually overlaid on a picture of the sample to identify regions of the sample with different sample properties.

In summary, as disclosed herein, the present invention allows the creation of an infrared imaging microscope for spectral analysis that has many advantages over traditional technology based on FTIR spectrometers. In particular, the present invention is meant to deal with the difficulties of illumination and imaging with a temporally coherent illumination beam that originates from a temporally coherent beam source such as a laser. As disclosed herein, the way to provide uniform, interference fringe free illumination is to eliminate multiple beam paths from the beam source to the sample 10, and from the sample 10 to the image sensor. More specifically, as provided herein, the optics are designed to allow interference-free illumination of a sample by using a illumination beam that has been transformed through reflections and lens elements alone, and not split into different paths and recombined. Similarly, the optics train for imaging the sample 10 onto the image sensor, e.g., onto a focal plane array, is meant to interact with the largely single transmission or reflection beam path from the laser illumination, and to map this to the image sensor without splitting into different paths and recombining.

In one embodiment, the imaging microscope can include a illumination beam, e.g., an infrared laser beam from a tunable QC laser, which can be directly pointed to the sample 10 in transmission mode. In such embodiment, the illumination beam, e.g., an infrared laser beam, can have an extent of approximately 3 mm×3 mm, so it illuminates the sample 10 nearly uniformly, without visible interference fringes. This direct illumination removes multiple beam paths. Without this invention, illumination with such an illumination beam would produce significant interference effects due to the temporal coherence of the beam source. With the invention, these effects are gone, allowing fast acquisition of an image with no interference artifacts.

Additionally, in reflection mode, the illumination beam can be coupled in through a transmitter-redirector, e.g., a beam splitter, to provide the same effect. Because the illumination beam traverses an objective lens before impinging on the sample 10, an illumination lens can be employed to project the illumination beam onto the sample 10 with sufficient extent to provide sufficient illumination.

Moreover, the present invention allows the use of a compact optical train based on refractive optical components. This in turn lends itself to a compact instrument design that is easier to manufacture, more robust for field deployment, and more cost effective for commercial products.

While a number of exemplary aspects and embodiments of an imaging microscope 12 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An imaging microscope for generating a two-dimensional image of a sample, the imaging microscope comprising:
   a beam source that emits a temporally coherent first illumination beam, the first illumination beam including a plurality of first rays;
   an illumination lens assembly that directs the first illumination beam at the sample, the illumination lens assembly adjusting the first illumination beam so that the first illumination beam illuminates a two-dimensional illuminated area on the sample all at once;
   an image sensor that converts a two dimensional, optical image into an array of electronic signals, the image sensor including a two-dimensional array of sensors that are used to construct the two-dimensional image of the sample; and
   an imaging lens assembly that receives rays from a plurality of points on the sample and forms a two-dimensional, first optical image of the sample on the image sensor without splitting and recombining the received rays.

2. An imaging microscope for generating a two-dimensional image of a sample, the imaging microscope comprising:
a beam source that emits a temporally coherent illumination beam, the illumination beam including a plurality of rays;
an illumination lens assembly that directs the illumination beam at the sample without splitting and recombining the illumination beam, the illumination lens assembly adjusting the illumination beam so that the illumination beam illuminates a two-dimensional illuminated area on the sample all at once;
an image sensor that converts an optical image into an array of electronic signals, the image sensor including a two-dimensional array of sensors that are used to construct the two-dimensional image; and
an imaging lens assembly that receives rays from the beam source that are transmitted through the sample and forms a two-dimensional, optical image on the image sensor.

3. The imaging microscope of claim 1 wherein the beam source is a MIR beam source and the illumination beam is at a beam wavelength that is within the MIR range; and wherein the illumination lens assembly is refractive in the MIR range.

4. The imaging microscope of claim 1 wherein the illumination lens assembly magnifies the illumination beam.

5. The imaging microscope of claim 4 wherein the illumination lens assembly adjusts the size of the first illumination beam so that the illuminated area on the sample is at least approximately twenty millimeters squared.

6. The imaging microscope of claim 1 wherein the imaging lens assembly collimates the received rays.

7. An imaging microscope for generating a two-dimensional image of a sample, the imaging microscope comprising:
a beam source that emits a temporally coherent first illumination beam, the first illumination beam including a plurality of first rays, and a temporally coherent, second illumination beam, the second illumination beam including a plurality of second rays;
an illumination lens assembly that directs the first illumination beam at the sample, the illumination lens assembly adjusting the first illumination beam so that the first illumination beam illuminates a two-dimensional illuminated area on the sample all at once;
a reflection lens assembly that directs the second illumination beam at the sample without splitting and recombining the second illumination beam, the reflection lens assembly adjusting the second illumination beam so that the second illumination beam illuminates a two-dimensional illuminated area on the sample all at once;
an image sensor that converts a two dimensional, optical image into an array of electronic signals, the image sensor including a two-dimensional array of sensors that are used to construct the two-dimensional image of the sample; and
an imaging lens assembly that receives rays from a plurality of points on the sample and forms a two-dimensional, first optical image of the sample on the image sensor, and wherein the imaging lens assembly further receives second rays from the second illumination beam that are reflected off of the sample and forms a two-dimensional, second optical image on the image sensor without splitting and recombining the received second rays.

8. An imaging microscope for generating a two-dimensional image of a sample, the imaging microscope comprising:
a beam source that emits a temporally coherent illumination beam, the illumination beam including a plurality of rays;
a reflection lens assembly that directs the illumination beam at the sample, the reflection lens assembly adjusting the illumination beam so that the illumination beam illuminates a two-dimensional illuminated area on the sample all at once;
an image sensor that converts a two dimensional, optical image into an array of electronic signals, the image sensor including a two-dimensional array of sensors that are used to construct the two-dimensional image of the sample; and
an imaging lens assembly that receives rays from a plurality of points on the sample and forms a two-dimensional, first optical image of the sample on the image sensor, wherein the imaging lens assembly forms the first optical image on the image sensor without splitting and recombining the received rays.

9. An imaging microscope for generating a two-dimensional image of a sample, the imaging microscope comprising:
a beam source that emits a temporally coherent illumination beam, the illumination beam including a plurality of rays;
a reflection lens assembly that directs the illumination beam at the sample without splitting and recombining the illumination beam, the reflection lens assembly adjusting the illumination beam so that the illumination beam illuminates a two-dimensional illuminated area on the sample all at once;
an image sensor that converts an optical image into an array of electronic signals, the image sensor including a two-dimensional array of sensors that are used to construct the two-dimensional image; and
an imaging lens assembly that receives rays from the beam source that are reflected off of the sample and forms a two-dimensional optical image on the image sensor.

10. An imaging microscope for generating a two-dimensional image of a sample, the imaging microscope comprising:
a beam source that emits a temporally coherent illumination beam, the illumination beam including a plurality of rays;
a reflection lens assembly that directs the illumination beam at the sample, the reflection lens assembly adjusting the illumination beam so that the illumination beam illuminates a two-dimensional illuminated area on the sample all at once;
an image sensor that converts a two dimensional, optical image into an array of electronic signals, the image sensor including a two-dimensional array of sensors that are used to construct the two-dimensional image of the sample;
an imaging lens assembly that receives rays from a plurality of points on the sample and forms a two-dimensional, first optical image of the sample on the image sensor, wherein the imaging lens assembly includes an objective lens and a projection lens; and
a beam splitter positioned between the objective lens and the projection lens, the beam splitter redirecting a first portion of the rays received by the imaging lens assembly at the sample, and the beam splitter transmitting a second portion of the rays received by the imaging lens assembly.

11. The imaging microscope of claim 8 wherein the beam source is a MIR beam source and the illumination beam is at a beam wavelength that is within the MIR range; and wherein the reflection lens assembly is refractive in the MIR range.

12. The imaging microscope of claim 8 wherein the reflection lens assembly magnifies the illumination beam.

13. The imaging microscope of claim 8 wherein the reflection lens assembly adjusts the size of the illumination beam so that the illuminated area on the sample is at least approximately twenty millimeters squared.

14. The imaging microscope of claim 8 wherein the imaging lens assembly collimates the received rays.

15. A method for generating a two-dimensional image of a sample, the method comprising:
   emitting a temporally coherent first illumination beam with a beam source, the first illumination beam including a plurality of first rays;
   directing the first illumination beam at the sample with an illumination lens assembly, the illumination lens assembly adjusting the first illumination beam so that the first illumination beam illuminates a two-dimensional illuminated area on the sample all at once;
   converting an optical image into an array of electronic signals with an image sensor, the image sensor including the two-dimensional array of sensors that are used to construct the two-dimensional image;
   receiving first rays from the beam source that are transmitted through the sample with an imaging lens assembly;
   forming a two-dimensional, first image on the image sensor with the rays received from the beam source by the imaging lens assembly that are transmitted through the sample;
   emitting a temporally coherent, second illumination beam with the beam source, the second illumination beam including a plurality of second rays;
   directing the second illumination beam at the sample with a reflection lens assembly, the reflection lens assembly adjusting the second illumination beam so that the second illumination beam illuminates a two-dimensional illuminated area on the sample all at once;
   receiving second rays from the beam source that are reflected off of the sample with the imaging lens assembly; and
   forming a two-dimensional second image on the image sensor with the second rays received from the beam source by the imaging lens assembly that are reflected off of the sample.

16. An imaging microscope for analyzing a sample, the imaging microscope comprising:
   a beam source that emits a temporally coherent illumination beam that is directed at the sample, the illumination beam including a plurality of rays; wherein the beam source is a tunable laser;
   an image sensor that converts an optical image into an array of electronic signals, the image sensor including a two-dimensional array of sensors; and
   an imaging lens assembly that receives rays from a plurality of points on the sample and forms a two-dimensional, first optical image of the sample on the image sensor;
   wherein the tunable laser generates a first illumination beam having a first wavelength that is directed at the sample and the imaging lens assembly receives the rays from the sample and forms the two-dimensional, first optical image of the sample on the image sensor; wherein the tunable laser generates a second illumination beam having a second wavelength that is directed at the sample and the imaging lens assembly receives the rays from the sample and forms a two-dimensional, second optical image of the sample on the image sensor; and wherein the second wavelength is different from the first wavelength.

17. The imaging microscope of claim 16 wherein the tunable laser is a mid-infrared beam source and each illumination beam has a beam wavelength that is within the mid-infrared range.

18. The imaging microscope of claim 17 further comprising an illumination lens assembly that directs the illumination beams at the sample, the illumination lens assembly adjusting the illumination beams so that the illumination beams illuminate a two-dimensional illuminated area on the sample all at once.

19. An imaging microscope for analyzing a sample, the imaging microscope comprising:
   a beam source that emits a temporally coherent illumination beam that is directed at the sample, the illumination beam including a plurality of rays;
   an image sensor that converts an optical image into an array of electronic signals, the image sensor including a two-dimensional array of sensors; and
   an imaging lens assembly that receives rays from a plurality of points on the sample and forms a two-dimensional, first optical image of the sample on the image sensor, wherein the imaging lens assembly forms the two-dimensional first optical image of the sample without splitting and recombining the received rays.

* * * * *